(12) United States Patent
Weber et al.

(10) Patent No.: US 10,685,254 B2
(45) Date of Patent: Jun. 16, 2020

(54) DEVICE AND METHOD FOR REPRESENTING AN ANATOMICAL SHAPE OF A LIVING BEING

(71) Applicant: KONINKLIJKE PHILIPS N.V., Eindhoven (NL)

(72) Inventors: Frank Michael Weber, Hamburg (DE); Irina Waechter-Stehle, Hamburg (DE); Rafael Wiemker, Kisdorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 85 days.

(21) Appl. No.: 15/769,213

(22) PCT Filed: Oct. 20, 2016

(86) PCT No.: PCT/EP2016/075300
§ 371 (c)(1),
(2) Date: Apr. 18, 2018

(87) PCT Pub. No.: WO2017/072029
PCT Pub. Date: May 4, 2017

(65) Prior Publication Data
US 2018/0307939 A1     Oct. 25, 2018

(30) Foreign Application Priority Data
Oct. 28, 2015 (EP) .................................. 15191825

(51) Int. Cl.
*G06K 9/62* (2006.01)

(52) U.S. Cl.
CPC ......... *G06K 9/6209* (2013.01); *G06K 9/6207* (2013.01); *G06K 2209/05* (2013.01)

(58) Field of Classification Search
CPC . G06K 9/6207; G06K 9/6209; G06K 2209/05
See application file for complete search history.

(56) References Cited

U.S. PATENT DOCUMENTS

| 5,474,062 A | * | 12/1995 | DeVires | ................ | A61M 16/00 |
| | | | | | 128/204.18 |
| 2002/0023654 A1 | * | 2/2002 | Webb | .................. | A61B 5/0031 |
| | | | | | 128/899 |

(Continued)

FOREIGN PATENT DOCUMENTS

| WO | 2012083136 A1 | 6/2012 |
| WO | 2014117096 A1 | 7/2014 |

OTHER PUBLICATIONS

Zhang, et al., "Adaptive Shape Prior Modeling Via Online Dictionary Learning", Chapter 4, Computer Vision in Medical Imaging, Aug. 5, 2013, pp. 59-74.

*Primary Examiner* — Brenda C Bernardi

(57) ABSTRACT

The present invention relates to a device for encoding an anatomical shape (13) of a living being, comprising a receiving unit (12) for receiving an anatomical shape (13); a shape representation generating unit (14) for generating a shape representation of the anatomical shape (13) by using one or more shape representation models and determining the value of one or more shape representation coefficients of the one or more shape representation models; and a conversion unit (16) for converting the determined value of the one or more shape representation coefficients into a human-readable code comprising one or more human-readable characters.

20 Claims, 2 Drawing Sheets

(56) References Cited

U.S. PATENT DOCUMENTS

| | | | | |
|---|---|---|---|---|
| 2012/0269412 A1* | 10/2012 | Guan | ............... | G06T 1/0028 |
| | | | | 382/128 |
| 2014/0155730 A1* | 6/2014 | Bansal | ............... | G01V 3/14 |
| | | | | 600/409 |
| 2015/0342560 A1* | 12/2015 | Davey | ............... | A61B 8/085 |
| | | | | 600/443 |

* cited by examiner

| decimal value | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| human-readable charcter | a | b | c | d | e | f | g | h | i | j | k | l | m | n | o | p | q | r | s | t | u | v | w | x | y | z | A | B | C | D | E | F |
| decimal value | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
| human-readable charcter | G | H | I | J | K | L | M | N | O | P | Q | R | S | T | U | V | W | X | Y | Z | 0 | 1 | 2 | 3 | 4 | 5 | 6 | 7 | 8 | 9 | - | + |

DEVICE AND METHOD FOR REPRESENTING AN ANATOMICAL SHAPE OF A LIVING BEING

This application is the U.S. National Phase application under 35 U.S.C. § 371 of International Application No. PCT/EP2016/075300, filed on Oct. 20, 2016, which claims the benefit of European Application Ser. No. 15191825.7, filed Oct. 28, 2015. These applications are hereby incorporated by reference herein.

FIELD OF THE INVENTION

The present invention relates to a device and method for encoding an anatomical shape of a living being. It finds application in the field of reporting anatomical shape information. In particular, the present invention finds application in storing and retrieving 3D anatomical shape information from Picture Archiving and Communication Systems (PACS) and Electronic Patient Record (EPR) systems.

BACKGROUND OF THE INVENTION

Medical information is normally stored as either image data or plain text data. While more complex 3D representations of anatomical shapes, e.g. resulting from a model-based segmentation (MBS), become more frequently available, they are typically stored in special formats. For instance, the results of MBS are meshes containing the positions of points and connections between them.

The high data complexity of anatomical meshes makes it difficult to store such information in normal PACS or reporting systems. Furthermore, despite ongoing digitalization, the exchange of information over classical pathways such as phone or paper is still essential in daily clinical practice, which is especially difficult taking into account the complexity of the data. In particular, devices and computers in hospitals may not be connected to the internet for security reasons or are inaccessible due to restrictive firewalls, thereby making any direct electronic exchange of binary data impossible.

CN 102592160 B shows an encoding method for encoding matrix barcodes, the encoding method being characterized by the steps of generating a data flow of length "k" from source code data information according to encoding rules, selecting a debugging level "1" according to the data flow of length "k", using the data flow of length k as input to generate a number "c" of debugging code characters in the Galois field according to algorithms of the debugging level "1", adding the number c of debugging code characters to the data flow of length k in order to form a total data flow.

SUMMARY OF THE INVENTION

It is an object of the present invention to provide a device and method for encoding an anatomical shape of a living being which facilitate the storing and exchanging of image information about the anatomical shape even for high data complexity of the medical data containing the anatomical shape.

In a first aspect of the present invention a device for encoding an anatomical shape of a living being is provided which comprises a receiving unit for receiving an anatomical shape, a shape representation generating unit for generating a shape representation of the anatomical shape by using one or more shape representation models and determining the value of one or more shape representation coefficients of the one or more shape representation models and a conversion unit for converting the determined value of the one or more shape representation coefficients into a human-readable code comprising one or more human-readable characters.

In a further aspect of the present invention a method for encoding an anatomical shape of a living being is provided which comprises the steps of receiving an anatomical shape, generating a shape representation of the anatomical shape by using one or more shape representation models and determining the value of one or more shape representation coefficients of the one or more shape representation models and converting the determined value of the one or more shape representation coefficients into a human-readable code comprising one or more human-readable characters.

In yet further aspects of the present invention, there are provided a computer program which comprises program code means for causing a computer to perform the steps of the method disclosed herein when the computer program is carried out on a computer as well as non-transitory computer-readable recording medium that stores therein a computer program product, which, when executed by a device, causes the method disclosed herein to be performed.

Preferred embodiments of the invention are defined in the dependent claims. It shall be understood that the claimed method and computer program have similar and/or identical preferred embodiments as the claimed device and as defined in the dependent claims.

The receiving unit may receive a medical image containing the anatomical shape. The medical image may be generated by imaging techniques such as X-ray radiography, magnetic resonance imaging (MRI), computer tomography (CT), ultrasound, endoscopy, elastography and positron emission tomography (PET), etc. However, the anatomical shape can exist without the medical image. For instance, when an image is segmented, the image is discarded and only the adapted shape representation model is left. Alternatively, the receiving unit may receive a result of a simulation containing data for the anatomical shape. The simulation may be a biophysical simulation. In this case, the anatomical shape to be encoded exists without the presence of an image. The medical image may be a segmented medical image which has been segmented using a model-based segmentation (MBS). Alternatively, the device may further comprise a segmentation unit for segmenting the received medical image, in particular using a MBS.

The shape representation generating unit is configured to generate a shape representation of the anatomical shape, e.g. of an organ, an organ portion and/or a tissue of the living being, using one or more shape representation models. The one or more shape representation models may be a point distribution model (PDM), in particular a linear point distribution model or a non-linear point distribution model. Additionally or alternatively, the one or more shape representation models may be landmark-based models, landmark-free models, deformation models, superimposition models, shape statistics-based models, function analysis-based models, view-based models, topology-based models, and/or hybrid models.

The one or more shape representation models utilize one or more shape representation coefficients with which the anatomical shape are mathematically described and represented. The shape representation of the anatomical shape is generated based on determining the value for the one or more shape representation coefficients.

The conversion unit is configured to convert the value of the one or more shape representation coefficients of the utilized shape representation model(s) into a human-readable code. The human-readable code comprises one or more human-readable characters, such as linguistic symbols, digits and/or mathematical symbols. A linguistic symbol is for instance a letter of a known human language. Alternatively, the linguistic symbol may be a modified letter which has been modified from a known human language. A mathematical symbol is for instance a calculative symbol such as "+", "−", "×", "/", . . . etc. Alternatively or additionally, each of the human-readable characters may comprise a physical symbol, a chemical symbol, a biological symbol and/or a physiological symbol.

Human-readable characters/symbols are, in contrast to machine-readable characters/codes designed for being read by electronic, mechanical or optical devices or computers, designed for being read and recognized by humans. It is understood that any human-readable character/symbol may be utilized to the human-readable code. Preferably, the human-readable code comprises a string and/or character chain of the one or more human-readable characters.

In this way, the anatomical shape is encoded into a human-readable code that is recognizable by humans. This is different from devices known in the past which are used to encode anatomical shapes into machine-readable codes. In particular, the present invention is able to encode anatomical shapes into human-readable codes based on unicode text and/or text based on American standard code for information interchange (ASCII) and/or text based on universal coded character set+transformation format-8 bit (UTF-8). In particular, it allows to encode anatomical shapes into a subset of these character sets, such that the subsets are human-readable and/or limited to characters that can be stored in PACS/EPR systems or DICOM datasets. In contrast, machine-readable codes and/or formats are normally presented in a binary representation that are not or very difficult to read for humans.

The present invention therefore facilitates storing and exchanging of medical information about anatomical shapes. This is particularly advantageous when the medical data containing the anatomical shape have high data complexity.

Further, the shape representation is simplified since the encoding of the anatomical shape is based on converting the one or more shape representation coefficients. This means that only the value of the shape representation coefficients, which can be stored using a storage medium within the device or an external storage medium, need to be processed in order to obtain the human-readable code. Instead of storing the one or more shape representation coefficients as floating point numbers which are difficult or even impossible to read for humans, the present invention enables to convert such shape representation coefficient values to human-readable characters.

In a preferable embodiment, the conversion unit is configured to determine one or more decimal values and/or bit blocks from the one or more shape representation coefficient values. In this way, the present invention utilizes one or more decimal values in order to obtain the human-readable code. Each bit block may have a predefined number of bits, in particular the same predefined number of bits. The one or more shape representation coefficient values typically contain one or more floating point numbers. Each of the floating point numbers can be converted to a bit block consisting of 8 bits. Such a bit block is a "minifloat", i.e. an 8-bit approximation of a floating point value. This increases the efficiency of encoding the anatomical shape since it makes the strings shorter.

Alternatively or additionally, the conversion unit may be configured to concatenate the shape representation coefficient values. In particular, a concatenation of N minifloats (N being the number of the shape representation coefficients) results in a bit chain of length 8*N. The approximation of the floating point numbers is advantageously short and efficient. If higher precision is required, however, also a 16-bit, 32-bit or 64-bit representation may be used.

In another preferable embodiment, the conversion unit is configured to assign the human-readable character to the decimal value or to assign each of the human-readable characters to a corresponding one of the decimal values, and/or to use a predetermined table containing the one or more human-readable characters and the one or more decimal values. This enables to encode the anatomical shape with increased accuracy and efficiency.

In another preferable embodiment, the conversion unit is configured to generate one or more regrouped bit blocks from the one or more bit blocks. Advantageously, the regrouping of the one or more bit blocks enables to use a lower number of encoding bits that is determined by the amount of human-readable characters, while at the same time not wasting space (as e.g. when two 6-bit blocks are used to describe an 8-bit element and the first 8 bits are used while the last 4 bits remain unused).

In another preferable embodiment, the bit block or each of the bit blocks consists of a first predefined number of bits, preferably eight bits, wherein the regrouped bit block or each of the regrouped bit blocks consists of a second predefined number of bits, preferably six bits, wherein the second predefined number differs from the first predefined number. In this way, the regrouping of the one or more bit blocks into the one or more regrouped bit blocks is particularly easy, since each bit block and each regrouped bit block has a predefined number of bits. The bit chain consisting of a plurality of 8-bit-blocks is split into 6-bit-chunks. If the length of the bit chain is not dividable by 6, padding zeros may be inserted at the end of the regrouped bit block.

In another preferable embodiment, the conversion unit is configured to assign the decimal value to the regrouped bit block or to assign each of the decimal values to a corresponding one of the regrouped bit blocks. This can be done by using a decimal-binary-conversion. For instance, each regrouped bit block, e.g. a 6-bit chunk, can be assigned with a decimal value lying between 0 and 63. Advantageously, the determination of the one or more decimal values and therefore the conversion of the one or more shape representation coefficient values is further facilitated.

In another preferable embodiment, the conversion unit is configured to generate one or more character sequences from the one or more human-readable characters. In this way, the human-readable code may be a sequence of the one or more human-readable characters. Alternatively, the human-readable code may be a plurality of sequences each consisting of one or more human-readable characters. Advantageously, the human-readability of the human-readable code is increased.

In another preferable embodiment, the device further comprises a decoding unit for determining a decoded anatomical shape from the human-readable code and/or an anonymization unit for activating or deactivating an anonymization for an image portion using the human-readable code. The decoded anatomical shape can be determined by converting the human-readable code to one or more shape representation coefficient values of one or more shape representation models. Advantageously, the present invention further enables easy decoding of anatomical shapes from human-readable characters. Further advantageously, anonymization and de-anonymization of the image portion is particularly easy. This can be done by adding, where the anonymization is applied, an image noise to a region of an anatomical image defined by an anatomical shape. Alternatively, a code may be generated during the anonymization that encodes a seed for generating an image noise and that encodes the anatomical shape in which the image noise was added. Further, a code may be used to deactivate the anonymization by computing the region from the code and by computing the image noise from the code and then subtracting the noise in the corresponding regions of the image.

In another preferable embodiment, the human-readable code contains a subcode related to one of selecting a shape representation model, detecting errors in the human-readable code and encoding a translation, scaling, rotation or affine transformation. In this way, information related to the selection of the shape representation model is easily provided. Also, typos or invalid codes can be effectively prevented when encoding the anatomical shape into the human-readable code.

Preferably, the device further comprises a position determination unit for determining a position based on the translation, the scaling, the rotation and/or the affine transformation. Such a position can be used to place the decoded shape back into an image, from which the original anatomical shape has been extracted.

In another preferable embodiment, the shape representation generating unit is configured to use a sparse representation. In this way, data space can be more efficiently used in cases where a plurality of different modes are needed to describe the shape space of the anatomical shape.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Medical information is mainly stored as either images or plain text. While complex 3D representations of anatomical shapes become more frequently available, they are typically stored in special formats. For instance, the results of model-based segmentation (MBS) are meshes containing the positions of image points and connections between them.

The data complexity of e.g. anatomical meshes makes it difficult to store such information in normal PACS or reporting systems. Furthermore, despite ongoing digitalization, the exchange of information over classical pathways such as phone or paper is still essential in everyday clinical practice, which is especially difficult regarding the data complexity of the medical information. For instance, devices and computers in hospitals may not be connected to the internet for security reasons or are inaccessible due to restrictive firewalls, thus making any direct electronic exchange of medical data, in particular image data impossible.

Figure 1:
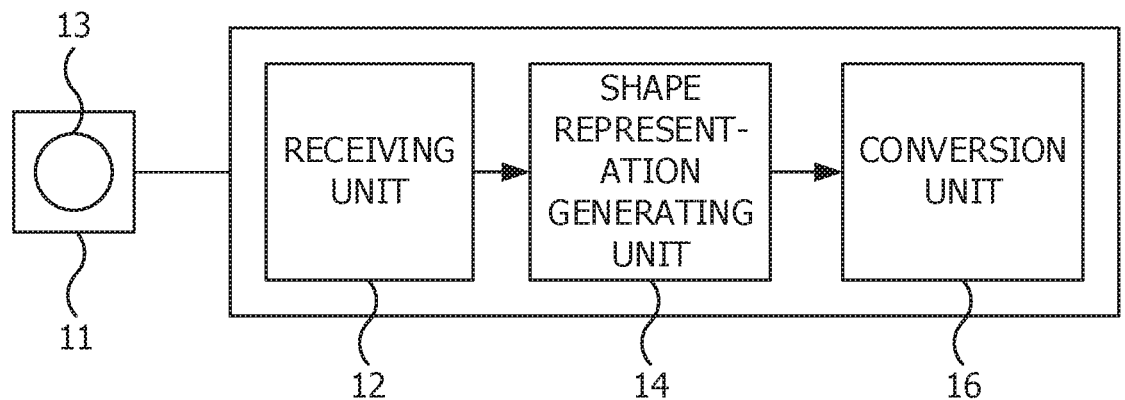
FIG. 1 shows a schematic block diagram of an device according to the present invention.

FIG. 1 shows a schematic block diagram of an device 10 for encoding an anatomical shape 13 contained in a medical image 11 of a living being. The medical image 11 may be generated by imaging techniques such as X-ray radiography, magnetic resonance imaging (MRI), computer tomography (CT), endoscopy, elastography and positron emission tomography (PET), etc.

The device 10 comprises a receiving unit 12 for receiving the medical image 11, a shape representation generating unit 14 for representing the anatomical shape 13 in the received medical image 11 using one or more shape representation coefficient values of one or more shape representation models, and a conversion unit 16 for converting the one or more shape representation coefficient values into a human-readable code comprising one or more human-readable characters.

The one or more shape representation coefficient values may be used within a point-distribution model (PDM). Instead of storing such coefficients as floating points and/or numbers, converting such coefficient values to the human-readable code is possible which differs from a machine-readable code by being designed to be read/recognized by humans. The human-readable code may be a plain-text string. The plain text string is especially suitable to be stored in PACS/EPR systems or DICOM data.

Additionally or alternatively, the human-readable code may comprise one or more linguistic symbols, mathematical symbols, physical symbols, chemical symbols, biological symbols, physiological symbols and/or digits. The linguistic symbols may be letters from one or more human languages. The one or more shape representation coefficient values may be stored using a storage unit integrated to the device or an external storage unit.

In this way, the encoding of the anatomical shape 13 contained in the received medical image 11 is mainly based on the one or more shape representation coefficient values. In particular, only the one or more shape representation coefficient values need to be further processed and/or stored in order to be converted into the human-readable code, thereby greatly reducing the length of the resulting code.

The anatomical shape 13 may result from a segmentation of the medical image 11. For instance, the anatomical shape 13 may be obtained from a model-based segmentation (MBS) of the medical image 11, either using a segmentation unit integrated to the device or an external segmentation unit. This means that the medical image 11 may be a segmented medical image before being received by the receiving unit 12.

As mentioned above, the anatomical shape can exist without an image. For instance, there can be an anatomical model without an image, or an anatomical model derived from an image, for which the image is no longer available. Although the receiving unit 12 shown in FIG. 1 is configured to exemplarily receive the medical image 11, it may alternatively receive the anatomical shape 13 without any image For instance, when an image is segmented, the image is discarded and only the adapted shape representation/anatomical model is left. Alternatively, the receiving unit 12 may receive a result of a simulation containing data for the anatomical shape 13. Advantageously, the anatomical shape 13 can be encoded into a human-readable code, in particular a short string, which can be stored as plain text instead of floating point numbers or other special formats. This significantly facilitates the storing and exchanging of medical information about the anatomical shape 13 of the living being. When a user needs such information, he can simply use a decoding device to read the human-readable code and recognize the relevant details of the anatomical shape. This is particularly advantageous when dealing with image data having high data complexity.

Figure 2:
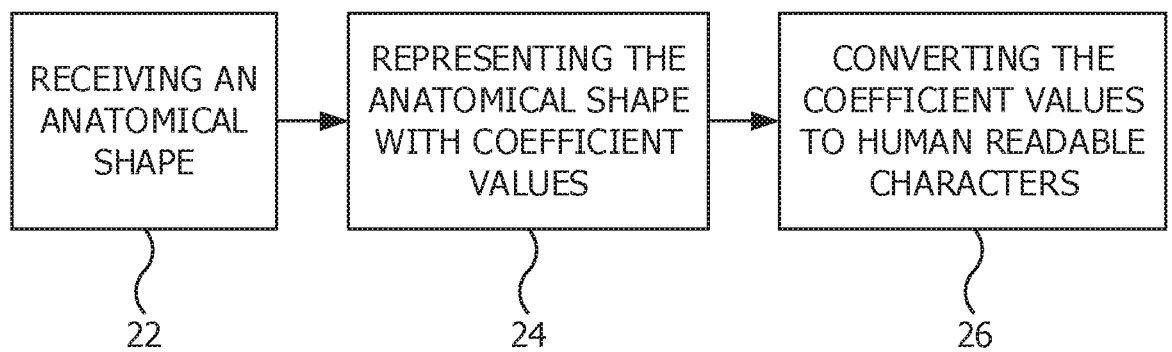
FIG. 2 shows a schematic block diagram of a method according to the present invention.

FIG. 2 shows a schematic block diagram of a method according to the present invention. The method comprises the steps of receiving an anatomical shape 22, representing the received anatomical shape using one or more shape representation coefficient values of one or more shape representation models 24, and converting the one or more shape representation coefficient values into a human-readable code comprising one or more human-readable characters 26.

Figures 3, 4:
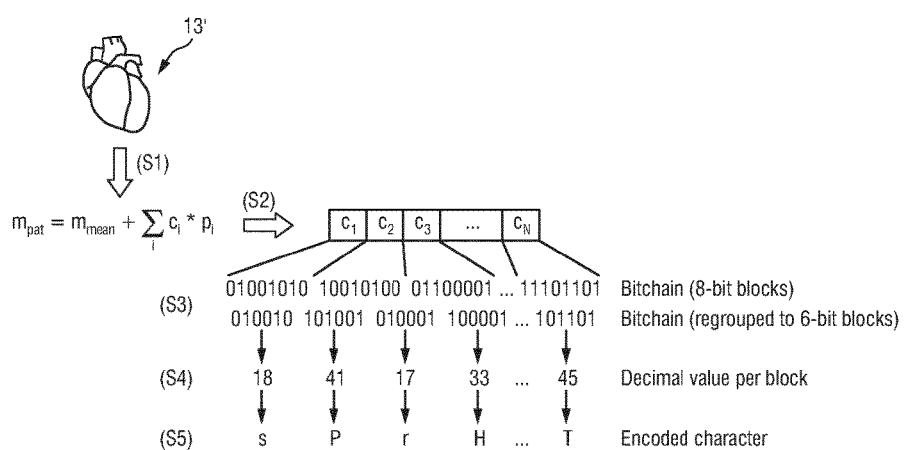
FIG. 3 shows a schematic illustration of a method according to another embodiment of the present invention.
FIG. 4 shows an exemplary table used for encoding an anatomical shape according to the present invention.

FIG. 3 shows an illustrative representation of a method according to another embodiment of the present invention. An anatomical shape, for instance, a heart 13', can be described by a shape representation model such as an anatomical model. In particular, the shape 13' is described by a mesh containing $N_P$ points and $N_T$ connections between the points, wherein the connections may be connecting triangles. Variations of the shape 13' can be described by a point distribution model (PDM) which involves a mean shape $m_{mean}$ and a number $N_M$ mode vectors $p_i$ that span a shape space. Typically, the majority of common shape variations can be described in this way. A given state of the heart shape 13' can be expressed therefore as a linear combination of the shape modes according to:

$$m_{pat} = m_{mean} + \Sigma_i c_i * p_i \quad (1)$$

In this model, the mean shape $m_{mean}$ represents the average shape or the basis shape of the heart shape 13', wherein the summation of the mode vectors $p_i$ each multiplied by a corresponding shape representation coefficient $c_i$ represents different variations of the heart shape 13', so that $m_{pat}$ represents the final heart shape resulting from the variations superimposed onto the mean shape.

In this way, the heart shape 13' is expressed using a set of shape representation coefficients $c_i$, resulting in a simplified shape representation. The coefficients $c_i$ of the PDM, which can be stored using an internal storage unit of the device 10 or an external storage unit, are then converted to a chain of human-readable characters, in particular a plain-text string consisting of letters, digits and common characters such as "+" and "−". In this way, the coefficients do not need to be stored as floating points numbers. Instead, they can be stored by the human-readable characters that approximate the anatomical shape.

In order to do so, a set of 64 human-readable characters is selected consisting of 26 Roman letters in lower case, 26 Roman letters in upper case, 10 digits and the mathematical symbols "+" and "−". This set of characters is shown in a conversion table in FIG. 4, in which to each human-readable character a corresponding decimal value is shown.

According to the method shown in FIG. 3, the heart shape 13' is first represented using a point-distribution model (PDM) in step S1. In step S2, the plurality of shape representation coefficients $c_i$ are concatenated, which results in a concatenated bit chain. Preferably, the floating values of the coefficients $c_i$ can be approximated as 8-bit minifloat values. Subsequently, the bit chain from step S2 is regrouped to a plurality of bit blocks each containing six bits in step S3.

In step S4, a decimal value is calculated for each six-bit block, preferably according to a decimal-binary conversion. In step S5, a human-readable character is assigned to each of the decimal values obtained in step S4 according to the conversion table shown in FIG. 4, which is preferably a predetermined conversion table. Finally, the individual human-readable characters each assigned to a corresponding decimal value are concatenated to a character chain, a character sequence or string.

The set of 64 human-readable characters shown in FIG. 4 are configured to cover a space of six bits (i.e. 6-bit space).

The device 10 may further comprise a decoding unit for determining a decoded anatomical shape from the human-readable code acquired from the encoding process. In particular, it is possible to decode a string into a shape by simply reversing the encoding process. For instance, the decoding may comprise converting the one or more human-readable characters to values, e.g. decimal values converting the values to a plurality of bit blocks, e.g. 6-bit blocks, regrouping the bit blocks to 8-bit blocks, e.g. using 8-bit approximations of a floating point value resulting in "minifloats", calculating for each 8-bit block a shape representation coefficient value, assembling a decoded anatomical shape based on a shape representation model using the calculated coefficients.

One or more steps of the afore-mentioned decoding progress can be omitted depending on the actual encoding process applied to encode the anatomical shape according to the present invention. Advantageously, the present invention enables easy back-converting the human-readable code, e.g. string, into an anatomical shape, in particular, one or more anatomical models can be determined which underlie the encoding process leading to the human-readable code. Once the underlying anatomical model(s) is (are) determined, the one or more shape representation coefficients used in such model(s) can be calculated when decoding the human-readable code. Preferably, the decoded anatomical shape can be approximated using a mean model, to which one or more shape modes are added after these have been multiplied with the calculated coefficients, thereby leading to respective portions of the shape modes.

The human-readable code may contain a subcode. Such a subcode may be related to selecting a shape representation model. This is particularly advantageous if not only one but several anatomical models can be used to perform shape representation. For instance, different anatomical models may be applied to represent the shape of different organs, wherein a database of the different anatomical models can be built up. The information about selecting one or more of the models can be additionally encoded into the human-readable code, e.g. string, as a subcode.

Preferably, each model may be assigned with a unique ID in the database. Alternatively or additionally, a predefined number of characters of the human-readable code, such as the first M characters, can be reserved for the ID of the model to be selected. In the case that a plurality of different modes, such as shape modes of a PDM, are used to describe the shape space, the shape representation generating unit 14 can be configured to use a sparse representation for encoding the coefficients $c_i$ into the string. For instance, instead of concatenating the coefficients $c_i$ only, pairs of <index i, coefficients $c_i$> can be encoded such that only those coefficients relevant for the anatomical shape that is to be encoded are needed in order to describe the shape space.

If not only the anatomical shape itself but also a position of the shape in a certain reference frame (e.g. chosen within an image such as the medical image containing the anatomical shape) are to be encoded, additional parameters regarding a translational and/or a rotational matrix or generally affine transformation can be encoded additionally.

The afore-mentioned subcode contained in the human-readable code may be related to detecting errors in the human-readable code. Such a subcode may be an additional checksum character or a string added to the human-readable code, e.g. string.

Additionally or alternatively, the human-readable code may be used as a key to process, in particular to activate or deactivate an image anonymization (e.g. of a head scan). This can be done by adding an image noise in one or more regions of the image which are to be anonymized, while the rest of the image is preferably not affected.

The anonymization of the relevant portions can be easily activated, e.g. based on a seed point. The anonymization can be reversed using a key, in particular if the added image noise is determined in a deterministic manner based on a seed point and if it is known for each image point, e.g. pixel and/or voxel, whether an image noise has been added or not.

The image portion(s) to be left-untouched-can be represented using a PDM, so that the encoding of the anatomical image is done based on converting the coefficients of the PDM into a human-readable string describing the anatomical model. For removing the anonymization, e.g. image noise, the string can be used as a key together with the seed point in order to reverse the anonymization, e.g. the application of image noise.

In this way, the human-readable code, e.g. the string, is generated during the activation of the anonymization and can be used to serve as a key to deactivate the anonymization of an image portion, in particular to de-identify data of the medical image. Preferably, the one or more shape representation model used to represent the anatomical shape is able to define an image region that is to be blurred with an image noise. A key can be provided to describe such an image region. In order to de-blur the image, the key is then needed.

Alternatively or additionally, a key for deactivating anonymization of an image portion can be provided as a subcode contained in the human-readable code.

In further preferable embodiments, the human-readable code, in particular the character chain, can be used in multiple occasions. For instance, it may be stored in medical records that do not support complex formats. Furthermore, it can easily be transmitted over classical pathways, such as via phone or mail, even if no direct internet connection is available (e.g. due to a firewall). The human-readable code representing the encoded anatomical shape, e.g. the string, can for instance be used to store a 3D anatomical shape in a system that only supports text data and/or image data. Additionally or alternatively, the string can be used to exchange 3D anatomical shape information via text of e.g. mail, text and/or phone communication systems.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A device for encoding an anatomical shape of a living being, comprising:
   a receiving unit for receiving an anatomical shape corresponding to anatomical tissue of interest;
   a shape representation generating unit for generating a shape representation of the anatomical shape by using one or more shape representation models and based on an average shape of the anatomical tissue of interest, mode vectors and one or more shape representation coefficients wherein each of the one or more shape representation coefficients represents a different variation of a shape of the anatomical tissue of interest, and for determining a value of one or more shape representation coefficients of the one or more shape representation models; and
   a conversion unit for converting the determined value of the one or more shape representation coefficients into a human-readable code comprising one or more human-readable characters.

2. The device according to claim 1, wherein the receiving unit is configured to receive a medical image containing the anatomical shape.

3. The device according to claim 1, wherein the human-readable character or each of the human-readable characters comprises a linguistic symbol, a digit, a mathematical symbol, a physical symbol, a chemical symbol, a biological symbol and/or a physiological symbol.

4. The device according to claim 1, wherein the conversion unit is configured to determine one or more decimal values and/or one or more bit blocks from the value of the one or more shape representation coefficients.

5. The device according to claim 4, wherein the conversion unit is configured to assign the human-readable character to the decimal value or to assign each of the human-readable characters to a corresponding one of the decimal values, and/or to use a predetermined table containing the one or more human-readable characters and the one or more decimal values.

6. The device according to claim 4, wherein the conversion unit is configured to generate one or more regrouped bit blocks by regrouping the one or more bit blocks.

7. The device according to claim 6, wherein the bit block or each of the bit blocks consists of a first predefined number of bits, and wherein the regrouped bit block or each of the regrouped bit blocks consists of a second predefined number of bits, wherein the second predefined number differs from the first predefined number.

8. The device according to claim 7, wherein the first predefined number of bits is 8 bits and the second predefined number of bits is 6 bits.

9. The device according to claim 6, wherein the conversion unit is configured to assign the decimal value to the regrouped bit block or to assign each of the decimal values to a corresponding one of the regrouped bit blocks.

10. The device according to claim 9, wherein the conversion unit is configured to assign the one or more decimal values according to a decimal-binary-conversion.

11. The device according to claim 1, further comprising a decoding unit for determining a decoded anatomical shape from the human-readable code and/or an anonymization unit for activating or deactivating an anonymization for an image portion using the human-readable code.

12. The device according to claim 1, wherein the human-readable code contains a subcode related to one of selecting a shape representation model, detecting errors in the human-readable code and encoding a translation, scaling, rotation or affine transformation.

13. The device according to claim 12, further comprising a position determination unit for determining a position based on the translation, the scaling, the rotation and/or the affine transformation.

14. The device according to claim 1, wherein the shape representation generating unit is configured to use a sparse representation.

15. The device according to claim 1, wherein the shape representation generating unit determines the shape representation as a linear combination of the average shape and a summation of the mode vectors multiplied by corresponding shape representation coefficients of the one or more shape representation coefficients.

16. The device according to claim 15, wherein the conversion unit converts the determined value of the one or more shape representation coefficients into a predetermined plain-text string consisting of a letter, a digit and/or a character.

17. The device according to claim 16, wherein the letter, the digit and the character are from a set of 64 human-readable characters, including 26 Roman letters in lower case, 26 Roman letters in upper case, 10 digits and mathematical symbols "+" and "−".

18. The device according to claim 17, further comprising:
concatenating a plurality of the shape representation coefficients to create a bit chain;
regrouping the bit chain into a plurality of bit blocks;
converting each bit block into a decimal value; and
assigning each of the decimal values a human-readable character from the set of 64 human-readable characters.

19. A method for encoding an anatomical shape of a living being, comprising the steps of:
receiving an anatomical shape corresponding to anatomical tissue of interest:
generating a shape representation of the anatomical shape by using one or more shape representation models and based on an average shape of the anatomical tissue of interest, mode vectors and one or more shape representation coefficients, wherein each of the one or more shape representation coefficients represents a different variation of a shape of the anatomical tissue of interest;
determining a value of one or more shape representation coefficients of the one or more shape representation models; and
converting the determined value of the one or more shape representation coefficients into a human-readable code comprising one or more human-readable characters.

20. A non-transitory computer-readable recording medium configured to store a computer program comprising program code means, which when executed by a computer causes the computer to carry out the steps of:
receive an anatomical shape corresponding to anatomical tissue of interest;
generate a shape representation of the anatomical shape by using one or more shape representation models and based on an average shape of the anatomical tissue of interest, mode vectors and one or more shape representation coefficients, wherein each of the one or more shape representation coefficients represents a different variation of a shape of the anatomical tissue of interest;
determine a value of one or more shape representation coefficients of the one or more shape representation models; and
convert the determined value of the one or more shape representation coefficients into a human-readable code comprising one or more human-readable characters.

* * * * *